United States Patent
Brons et al.

(10) Patent No.: US 6,504,062 B2
(45) Date of Patent: Jan. 7, 2003

(54) PROCESS FOR THE PREPARATION OF ODOR-LEAN POLYETHER POLYOLS

(75) Inventors: Henricus Maria Johannes Brons, Louvain-la-Neuve (BE); Hans De Vos, CM Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/623,633

(22) PCT Filed: Mar. 11, 1999

(86) PCT No.: PCT/EP99/01628

§ 371 (c)(1), (2), (4) Date: Sep. 6, 2000

(87) PCT Pub. No.: WO99/47582

PCT Pub. Date: Sep. 23, 1999

(65) Prior Publication Data

US 2002/0183560 A1 Dec. 5, 2002

(30) Foreign Application Priority Data

Mar. 13, 1998 (IS) ................................................ 4687

(51) Int. Cl.[7] ........................ C07C 41/38; C07C 41/34; C07C 41/44
(52) U.S. Cl. ...................... 568/621; 528/486; 528/487; 528/490; 528/499; 568/620
(58) Field of Search .................. 528/486, 487, 528/490, 499; 568/620, 621

(56) References Cited

U.S. PATENT DOCUMENTS 4,306,943 A * 12/1981 Mori et al. ................ 203/29
4,507,475 A * 3/1985 Straehle et al. ............ 536/120
5,672,768 A * 9/1997 Gupta et al. ............... 568/621

FOREIGN PATENT DOCUMENTS

| EP | 102508 | * | 3/1984 |
| EP | 466150 | * | 1/1992 |
| WO | 93/19113 | * | 9/1993 |

OTHER PUBLICATIONS

Chemical Abstracts, vol. 86, No. 22; May, 1977; Abstract No. 86:156254x; Generalova et al.; "Purification of polyoxyalkylene polyols"; XP–002108894; p. 21.*

Chemical Abstract, vol. 86, No. 22, May 30 1977 (May 30, 1977) Columbus, Ohio, US; abst. No. 156254x, Purification of Polyoxyalkylene polyols.

* cited by examiner

Primary Examiner—Rabon Sergent
(74) Attorney, Agent, or Firm—Y. Grace Tsang

(57) ABSTRACT

A process for the preparation of odor-lean polyether polyols from polyether polyol product stream obtained by reacting a starting compound having a plurality of active hydrogen atoms with one or more alkylene oxides, which process comprises the steps of: (a) contacting the polyether polyol product with an excess of acid having a pKa of less than 5 under hydrolysis conditions, (b) contacting the reaction mixture with excessive amount of water to form a two-phase system under hydrolysis conditions by adding an amount of water to form an organic phase and a water phase to reduce the amount of cyclic-ether compounds present in the polyether polyol product, and (c) recovering the odor-lean polyether polyol.

6 Claims, No Drawings

PROCESS FOR THE PREPARATION OF ODOR-LEAN POLYETHER POLYOLS

The present invention relates to a process for the preparation of substantially odour-lean polyether polyols from a polyether polyol starting product, which has been obtained by polymerizing at least one alkylene oxide in the presence of a suitable polymerization catalyst.

Methods for preparing polyether polyols, also sometimes referred to as poly(alkylene oxide) polyols, are well known in the art. Typically, such methods involve reacting a starting compound having a plurality of active hydrogen atoms with one or more alkylene oxides, such as ethylene oxide, propylene oxide, butylene oxide or mixtures of two or more of these. Suitable starting compounds include polyfunctional alcohols, generally containing 2 to 6 hydroxyl groups. Examples of such alcohols are glycol, such as diethylene glycol, dipropylene glycol, glycerol, di- and polyglycerols, pentaerythritol, trimethylolpropane, triethanolamine, sorbitol, mannitol, etc. Usually a strong base like potassium hydroxide is used as a catalyst in this type of reaction.

The polyether polyols obtained from the type of process described above as well as polyurethane foams manufactured from these polyether polyols usually suffer from a rather unpleasant odour. Although this odour does not adversely affect the chemical properties of the polyether polyol in any way, it would be desirable when polyether polyols could be provided not having such unpleasant odour. Since consumers have become more and more critical over the years, there is an increasing need for providing odour-lean products. Particularly in those applications where people come in close contact with polyurethane foams (e.g. in mattresses and pillows), the odour of the foam could be a problem. Since relatively large amounts of polyols are used in the manufacture of flexible polyurethane foams, it could be expected that at least some of the unpleasant odour of the polyurethanes stems from the polyols.

The present invention therefore aims to provide a method for reducing the odour of polyether polyols manufactured as alkylene adducts of polyfunctional alcohols, substantially as described above.

Accordingly, the present invention relates to a process for the preparation of an odour-lean polyether polyol from an unneutralised polyether polyol starting product which is obtained by reacting a starting compound having a plurality of active hydrogen atoms with one or more alkylene oxides, which process consists of the steps of:

(a) contacting the unneutralised polyether polyol product with an excess of an acid having a pKa of less than 5, at a temperature of 80 to 130° C., (b) contacting the reaction mixture with water at a temperature of 80 to 130° C., and (c) recovering the odour-lean polyether polyol, wherein the acid-is added in step (a) in such an excess so as to impart sufficient acidity to the reaction medium to allow the hydrolysis-reactions in steps (a) and (b) to proceed.

Without wishing to be bound by any particular theory it is believed that components which are for a large part responsible for the short term chemical odour of polyether polyols are aldehydes, present as such or in a latent form as alkenyl ether endgroups of the polyether polyol, while the long term musty odour of polyurethane foams is due to ether-like compounds -presumably cyclic ethers- formed during the polyol manufacturing, i.e. during the alkoxylation (so normally under basic conditions). Examples of such cyclic ethers could be 2-ethyl-4,7-dimethyl-1,3,6-trioxacyclo-octane and 2,5,8-trimethyl-1,4,7-trioxacyclononane. In the case of propylene oxide, for instance, the short term chemical odour is considered to be caused by propionaldehyde and propenylether end groups of the polyether polyol. For the sake of convenience, the odour causing compounds in case propylene oxide is used as the alkylene oxide will be further referred to in this patent application. It will, however, be understood that if other alkylene oxides are used, the odour-causing compounds will vary accordingly.

In step (a) of this process the propenylether end groups are removed from the unneutralised (i.e. the polyol end product as it leaves the reactor prior to working-up) polyether polyol by hydrolysis, thus resulting in propionaldehyde and a hydroxyl end group in the polyether polyol. In subsequent or simultaneous step (b) water is added in order to hydrolyse the cyclic ethers present, e.g. into propionaldehyde and dipropylene glycol. In step (c), finally, the odour-lean polyol is recovered. This recovery suitably involves several treatments, including dewatering and steam or nitrogen stripping to remove the propionaldehyde formed as one of the hydrolysis products in steps (a) and (b), as will be discussed hereinafter.

It is preferred within the context of the present invention that the polyether polyol starting product is obtained by polymerizing propylene oxide and optionally ethylene oxide. Nevertheless, other alkylene oxides may be used as well.

The acid to be used in step (a) of the present process in principle may be any water-soluble acid having a pKa less than 5, preferably of less than 3. The acid may be an organic or mineral acid. Examples of suitable organic acids are para-toluene sulphonic acid and acetic acid. Examples of suitable mineral acids include sulphuric acid, hydrochloric acid, nitric acid and phosphoric acid. It has been found particularly useful to use para-toluene sulphonic acid or phosphoric acid ($H_3PO_4$). A combination of both acids may also be suitably used. Para-toluene sulphonic acid was found to be particularly suitable when steps (a) and (b) are carried out simultaneously, whereas phosphoric acid is advantageously used when carrying out steps (a) and (b) successively.

If step (a) is carried out before step (b), the acid is suitably added in the form of a concentrated solution in water, for instance in a concentration of 50–90%. In addition, further water may also be added. The acid should be used in such amount so as to impart sufficient acidity to the reaction medium to allow the hydrolysis reactions in steps (a) and (b) to proceed. In practice the term "excess" in relation to the acid added in step (a) refers to such amount of acid that the amount of free acid will be between 0.001 and 0.5 mole acid per kg polyether polyol, preferably between 0.005 and 0.2 mole acid per kg polyether polyol. The expression "free acid" as used herein refers to the acid which has not reacted with any component present in the reaction medium. For instance, if unneutralised polyether polyol is used as the starting material in step (a) of the present process, potassium ions from the KOH initiator will be present in the polyol. The anion of the acid added will then first react with the potassium ions. Only after the potassium ions have been "neutralised", any acid added will be present as free acid.

The conditions under which the hydrolysis in step (a) is carried out may vary within wide limits. In general, the hydrolysis conditions can be varied within limits known by the person skilled in the art. It has been found particularly advantageous to carry out step (a) at a temperature of 80 to 130° C., preferably 100 to 120° C., at any arbitrary pressure ranging from essentially 0 bar up to 15 bar, preferably from 0.1 to 5 bar. If step (a) is carried out in vacuo, then the vacuum should be broken once step (a) is finished. The time necessary to carry out the reaction in step (a) may also vary within wide limits. Depending on the amount of excess acid used and the temperatures applied, the length of step (a) if carried out before step (b) will normally vary from several minutes to several hours, suitably from 10 minutes to 5 hours. It is preferred that while step (a) is carried out continuous mixing of the components takes place to ensure optimum contact between the reactants.

In step (b) of the present process water is added to the reaction mixture. The water is necessary to hydrolyse the cyclic ethers. Water can be added either in excess or in an equivalent or even lower amount. The term "excess" as used in this connection refers to such amount that a two-phase system can be formed, i.e. an amount of water that exceeds the solubility of water in the particular polyol to be treated under the process conditions applied. When equivalent or lower amounts of water are added, no separate water-phase is formed, i.e. the amount of water added does not exceed the solubility of water in the polyol under the conditions applied.

If an excess of water is added this eventually results in a two-phase system: an organic phase containing the polyol and part of the free acid and a water/acid phase. It is believed that in such a system the cyclic ethers, which initially are present in the organic phase, are extracted into the water/acid phase, where they are hydrolysed. If no excess of water is used, but only an equivalent or even lower amount, no separate water/acid phase will be formed. Step (b) can be carried out after step (a) or simultaneous with step (a). In the first case step (b) involves contacting the reaction product of step (a) with water (suitably an excess of water), whilst in the latter case excess acid and water (suitably in such amount that a one-phase system is formed) are simultaneously added to the neutralised or unneutralised polyether polyol starting product. As indicated herein before, the water is believed to hydrolyse the cyclic ethers present in the polyol. The amount of water added should be sufficient to hydrolyse the cyclic ethers present. The conditions under which step (b) are carried out may vary within broad limits. For an optimum result, however, it has been found advantageous to let the hydrolysis reaction take place at a temperature of 80 to 130° C., preferably 100 to 120° C., at any arbitrary pressure. Again, the reaction time is not particularly critical, but should be long enough to allow the hydrolysis reaction to be as complete as possible. Normally, the reaction time will vary from about 10 minutes to 10 hours, suitably from 15 minutes to 4 hours. It is preferred that while step (b) is carried out continuous mixing of the components takes place to ensure optimum contact between the reactants. If steps (a) and (b) are carried out simultaneously, the conditions under which both steps are carried out will be the same.

Step (c) of the present process, recovery of the odour-lean polyether polyol, can be carried out in different ways. Generally, the recovery will include treatments to ensure that the reaction products of steps (a) and (b) and the excess of water and acid still present in the reaction mixture are removed. In a preferred embodiment step (c) comprises the following subsequent stages:

(i) neutralisation,
(ii) optionally dewatering,
(iii) steam stripping, and
(iv) drying and filtration.

The neutralisation involves adding a base to the reaction mixture to increase the pH. Useful bases are water-soluble, strong bases, such as potassium hydroxide, sodium hydroxide and the like. The use of potassium hydroxide is preferred. The base may be added in one or more stages. Suitably, a first batch of base is added under continuous mixing and after some time (e.g. 10 minutes to 1 hour) the remainder of base is added to get the pH at the desired level. Neutralisation is suitably carried out at approximately the same temperature as applied in step (b) to avoid unnecessary loss of energy and to ensure a good neutralisation.

Dewatering, i.e. the removal of water from the reaction system can be carried out in ways known in the art, for example, by carrying out the dewatering at atmospheric conditions, possibly in combination with a vacuum dewatering treatment.

Steam stripping and/or nitrogen stripping takes place to remove substantially all the hydrolysis products formed in steps (a) and (b) from the polyether polyol. Hot steam and/or nitrogen is introduced into the optionally dewatered polyether polyol to strip off these hydrolysis products. In case the polyether polyol is based on propylene oxide, the main hydrolysis product is propionaldehyde. The pressure applied may vary over a broad range and normally will be between 0.01 and 10 bar, although higher pressures may be applied as well. In general, any stream stripping technique and/or nitrogen stripping technique can be applied, but for the purpose of the present invention it is preferred to work at subatmospheric conditions, more particularly at a pressure of 0.05 to 0.5 bar.

The polyether polyol product remaining after the removal of the hydrolysis products (i.e. mainly propionaldehyde) is finally dried and filtered to obtain the odour-lean polyether polyol.

The invention is further illustrated by the following examples.

EXAMPLE 1

A 5 liter reactor equipped with a stirrer was charged with 3000 g unneutralised polyether polyol (MW 3500, containing 0.24% wt potassium). While stirring under a slight nitrogen flow, the charge was heated to 110° C. and 31.4 g 75%wt $H_3PO_4$ (a 30% excess relative to potassium) was added. The reaction mixture was maintained at 110° C. during 60 minutes. Then 352 g water was added and stirring was continued for 60 minutes at 110° C. The reaction mixture was neutralised with 6.2 g 50% wt KOH during 30 minutes at 110° C. The temperature was raised to 120° C. and the reaction mixture was dried and volatiles were stripped off at 120° C. at a final pressure of 100 mbara using nitrogen as stripping gas. Crystals were filtered off.

The final product contained 0.2 mmol propenylether end groups per kg, which is a reduction of 98%. The musty odour initially observed for the unneutralised polyether polyol could no longer be detected. This was illustrated by comparative GC/MS analysis showing a 99% reduction of cyclic ether (2-ethyl-4,7-dimethyl-1,3,6-trioxacyclooctane and 2,5,8-trimethyl-1,4,7-trioxacyclononane) compared with the polyol intake. The propionaldehyde content was less than 1 ppm. The product was considered odour lean.

EXAMPLE 2

A 1 liter reactor equipped with a stirrer was charged with 491 g unneutralised polyether polyol (MW 3500, containing 0.24% wt K). While stirring under a slight nitrogen flow, the charge was heated to 90° C. and 7.5 g para-toluene sulphonic acid monohydrate (a 30% excess relative to K) dissolved in 59.1 g water was added. The reaction mixture, which consists of a dispersion of the water phase in polyol, was maintained at 90° C. during 2 hours.

The reaction mixture was neutralised with 1.05 g 50% wt KOH during 30 minutes at 90° C. The temperature was raised to 120° C. and the final mixture was dried and volatiles were stripped off at 120° C. at a final pressure of 100 mbara using nitrogen as stripping gas. Crystals were filtered off.

The final product contained 0.1 mmol propenylether end groups per kg, which is a reduction of 99%. The musty odour initially observed for the unneutralised polyether polyol could no longer be detected. This was illustrated by comparative GC/MS analysis showing a 99% reduction of cyclic ether (2-ethyl-4,7-dimethyl-1,3,6-trioxacyclooctane and 2,5,8-trimethyl-1,4,7-trioxacyclononane) compared with the polyol intake. The propionaldehyde was less than 1 ppm. The product was considered odour lean.

EXAMPLE 3

A 1 liter reactor equipped with a stirrer was charged with 473 g unneutralised polyether polyol (MW 3500, containing 0.24% wt K). While stirring under a slight nitrogen flow, the charge was heated to 90° C. and 7.2 g para-toluene sulphonic acid monohydrate (a 30% excess relative to K) dissolved in 3.7 g water was added. The reaction mixture, which is a homogeneous liquid mixture of excess para toluene sulphonic acid dissolved in polyol and a solid phase of K-salt of said acid, was maintained at 90° C. during 2 hours.

The reaction mixture was neutralised with 1.01 g 50% wt KOH during 30 minutes at 90° C. The temperature was raised to 120° C. and the final mixure was dried and volatiles were stripped off at 120° C. at a final pressure of 100 mbara using nitrogen as stripping gas. Crystals were filtered off.

The final product contained 0.1 mmol propenylether end groups per kg, which is a reduction of 99%. The musty odour initially observed for the unneutralised polyether polyol could no longer be detected. This was illustrated by comparative GC/MS analysis showing a 96% reduction of cyclic ether (2-ethyl-4,7-dimethyl-1,3,6-trioxacyclooctane and 2,5,8-trimethyl-1,4,7-trioxacyclononane) compared with the polyol intake. The propionaldehyde was less than 1 ppm. The product was considered odour lean.

Comparative Example 1

The procedure of Example 1 was repeated except that the addition of 352 g water was omitted.

The final product contained 0.2 mmol propenylether end groups per kg, which is a reduction of 98%. The level of cyclic ether (2-ethyl-4,7-dimethyl-1,3,6-trioxacyclooctane and 2,5,8-trimethyl-1,4,7-trioxacyclononane), however, was reduced by only 50% compared with the polyol intake, established by comparative GC/MS analysis. The propionaldehyde was less than 1 ppm. The product smelled musty, which is considered to be attributable to the presence of cyclic ethers.

What is claimed is:

1. A process for the preparation of an odour-lean polyether polyol from an unneutralised polyether polyol starting product which is obtained by reacting a starting compound having a plurality of active hydrogen atoms with one or more alkylene oxides, which, process comprises the steps of:
   (a) contacting the unneutralised polyether polyol product with an excess of an acid having a pKa of less than 5 at a temperature of 80 to 130° C.,
   (b) contacting the reaction mixture with water for from about 10 minutes to about 10 hours at a temperature of 80 to 130° C. by adding an amount of water exceeding the solubility of water in said polyether polyol product sufficient to form an organic phase and a water phase to reduce the amount of cyclic ether compounds present in the polyether polyol product, and
   (c) recovering the odour-lean polyether polyol, wherein the acid is added in step (a) in such an excess so as to impart sufficient acidity to the reaction medium with such amount of acid that the amount of free acid being between about 0.001 and about 0.5 mole acid per kg polyether polyol.

2. A process according to claim 1, wherein steps (a) and (b) are carried out simultaneously.

3. A process according to claim 1, wherein steps (a) and (b) are carried out consecutively.

4. A process according to claim 1, wherein the acid used in step (a) is phosphoric acid and/or para-toluene sulphonic acid.

5. A process for the preparation of an odour-lean polyether polyol from a polyether polyol starting product which is obtained by reacting a starting compound having a plurality of active hydrogen atoms with one or more alkylene oxides, which process comprises the steps of:
   (a) contacting the polyether polyol product with an excess of an acid having a pKa of less than 5 at a temperature of 80 to 130° C. to obtain a reaction product mixture, wherein said acid is added in a concentrated form in a concentration of at least 50 wt %,
   (b) contacting the reaction product mixture produced from (a) with water for from about 10 minutes to about 10 hours at a temperature of 80 to 130° C. by adding an amount of water exceeding the solubility of water in said polyether polyol sufficient to form an organic phase and a water phase to reduce the amount of cyclic ether present in the polyether polyol product, and
   (c) recovering the odour-lean polyether polyol, wherein the acid is added in step (a) in such an excess so as to impart sufficient acidity to the reaction medium with such amount of acid that the amount of free acid being between about 0.005 and about 0.2 mole acid per kg polyether polyol;
   wherein step (a) is carried out before step (b).

6. The process as claimed in claim 5, wherein step (a) is carried out for about 10 minutes to 5 hours.

* * * * *